United States Patent
Yamada et al.

(10) Patent No.: US 7,858,168 B2
(45) Date of Patent: Dec. 28, 2010

(54) HONEYCOMB STRUCTURE AND MANUFACTURING METHOD OF THE SAME

(75) Inventors: Toshio Yamada, Nagoya (JP); Takeshi Tokunaga, Nagoya (JP); Makoto Furutani, Komaki (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/410,796

(22) Filed: Mar. 25, 2009

(65) Prior Publication Data

US 2009/0246458 A1  Oct. 1, 2009

(30) Foreign Application Priority Data

Mar. 28, 2008 (JP) ............... 2008-088089

(51) Int. Cl.
*B32B 3/12* (2006.01)
(52) U.S. Cl. ..................... 428/116; 428/117
(58) Field of Classification Search .......... None
See application file for complete search history.

(56) References Cited

U.S. PATENT DOCUMENTS

| 5,720,787 | A |  | 2/1998 | Kasai et al. |
| 2004/0053005 | A1 |  | 3/2004 | Hamanaka et al. |
| 2006/0112669 | A1 |  | 6/2006 | Yamada et al. |
| 2007/0128405 | A1 | * | 6/2007 | Sakaguchi et al. ......... 428/116 |
| 2007/0169453 | A1 | * | 7/2007 | Hayakawa ................. 55/523 |
| 2008/0220205 | A1 | * | 9/2008 | Miwa et al. ............... 428/116 |
| 2009/0020918 | A1 |  | 1/2009 | Shoji et al. |
| 2009/0181167 | A1 |  | 7/2009 | Kimura et al. |

FOREIGN PATENT DOCUMENTS

| EP | 1 946 840 A1 | 7/2008 |
| EP | 2 085 131 A1 | 8/2009 |
| JP | A-8-281034 | 10/1996 |
| JP | A-2002-159811 | 6/2002 |
| JP | A-2006-116483 | 5/2006 |
| WO | WO 2007/052479 A1 | 5/2007 |
| WO | WO 2009/011434 A1 | 1/2009 |
| WO | WO 2009/011435 A1 | 1/2009 |

OTHER PUBLICATIONS

U.S. Appl. No. 12/174,699, filed Jul. 17, 2008, Kimura et al.
European Search Report for Application No. 09250818.3, issued Nov. 20, 2009.

* cited by examiner

*Primary Examiner*—Gordon R Baldwin
(74) *Attorney, Agent, or Firm*—Oliff & Berridge, PLC

(57) ABSTRACT

There is disclosed a honeycomb structure in which while sufficiently maintaining a collection efficiency and a bonding strength of a plugging portion, a thermal shock resistance is improved. A plugging portion 32 is formed in the end of each cell 3 of a honeycomb structure 1, and a gap 34 having a size of 20 μm or more is formed between the plugging portion 32 and each partition wall 2. Moreover, the length of the gap 34 in the axial direction is 50% or more and less than 95% of the length of the plugging portion 32 in the axial direction, the length of the gap in a face vertical to the axial direction is 20% or more and 50% or less of the length of the inner peripheral surface of the cell 3, and the gaps are formed in at least ⅓ of the plugging portions 32.

4 Claims, 12 Drawing Sheets

AXIAL LENGTH OF PLUGGING PORTION

AXIAL LENGTH OF PLUGGING PORTION

STEP 7

STEP 8

STEP 9

HONEYCOMB STRUCTURE AND MANUFACTURING METHOD OF THE SAME

BACKGROUND OF THE INVENTION

1. Field of the Invention

The present invention relates to a honeycomb structure, in which plugging portions are formed in the ends of cells, and a manufacturing method of the honeycomb structure.

2. Description of the Related Art

In consideration of influences on environments, there has been an increasing need to remove, from an exhaust gas, a particulate matter contained in the exhaust gas discharged from an internal combustion engine such as an engine for a car, an engine for a construction machine or a stationary engine for an industrial machine, other combustion devices or the like. In particular, regulations on the removal of the particulate matter (PM) discharged from a diesel engine tend to be strengthened worldwide. Because of such a situation, a diesel particulate filter (DPF) for collecting and removing the particulate matter attracts attention.

Examples of the DPF include a honeycomb filter having porous partition walls for partitioning a plurality of cells constituting fluid channels from one another. In the honeycomb filter, predetermined cells each having one open end and the plugged other end and remaining cells each having one plugged end and the other open end are alternately arranged, and a catalyst is carried by the inner surfaces of pores in the partition walls. When such a honeycomb filter is applied as the DPF, a fluid (the exhaust gas) which has flowed into the predetermined cell from the one open end thereof passes through the partition walls, and flows out as the passed fluid toward the remaining cells. Furthermore, the gas is discharged from the other open end of the remaining cell, whereby the particulate matter in the exhaust gas is oxidized and decomposed by the catalyst, and collected and removed by the pores.

On the other hand, a thermal shock stress is easily concentrated on a boundary between the partition wall and each plugging portion, and a crack is easily generated in the boundary. To solve the problem, a filter having a constitution in which the plugging portions substantially have non-uniform plugging thicknesses has been known (see JP-A-8-281034).

Furthermore, there has been known a honeycomb structure in which the sectional open ratio of a plugging portion in the vicinity of the partition wall is set to a ratio smaller than that of another plugging portion in the vicinity of a central axis, so that the breakdown of the plugging portion or the vicinity of the plugging portion due to the thermal shock is not easily caused (see JP-A-2006-116483).

However, in JP-A-8-281034, a large number of steps are required for the preparation of the filter. Moreover, in JP-A-2006-116483, any problem does not occur in a bonding strength between the plugging portion and the partition wall. However, in respect of a collection efficiency, according to comparison between a case where there is not any gap between the plugging portion and the partition wall and a case where the gap is present over the whole length of the plugging portion as especially shown in FIG. 3, a difference in a collection mass is hardly made, but a large difference in the number of the collected PMs is made.

SUMMARY OF THE INVENTION

An object of the present invention is to provide a honeycomb structure in which a resistance to thermal shock is improved while sufficiently maintaining a collection efficiency and a bonding strength of a plugging portion.

The present inventor has found that the above object can be achieved by forming plugging portions so as to make a gap having a predetermined length between each plugging portion and each partition wall. That is, according to the present invention, a honeycomb structure and a manufacturing method of the honeycomb structure are provided as follows.

[1] A honeycomb structure comprising: a plurality of cells partitioned from one another by porous partition walls and extending through the honeycomb structure in an axial direction to constitute flow paths of a fluid, wherein one end of each predetermined cell is plugged with a plugging portion made of a plugging material filled into the cell, the other end of each remaining cell opposite to the one end of the predetermined cell is similarly plugged with a plugging portion, in a part of the cells, a gap having a size of 20 μm or more is formed between the plugging portion and the partition wall, the length of the gap in the axial direction is 50% or more and less than 95% of the length of the plugging portion in the axial direction, the length of the gap in a face vertical to the axial direction is 20% or more and 50% or less of the length of the inner peripheral surface of the cell, and the gaps are formed in at least ⅓ of the plugging portions.

[2] The honeycomb structure according to the above [1], wherein the cells have a shape selected from the group consisting of a quadrangular shape, a hexagonal shape, a combination of the quadrangular shape and the hexagonal shape and a combination of the quadrangular shape and an octagonal shape.

[3] The honeycomb structure according to the above [2], wherein the gaps are formed in one side or two sides of each cell.

[4] The honeycomb structure according to any one of the above [1] to [3], wherein the plugging portions have lengths of 5 mm or less in the axial direction.

[5] A manufacturing method of the honeycomb structure according to any one of the above [1] to [4], comprising the steps of: providing a mask on each end face of the honeycomb structure before forming the plugging portions in the honeycomb structure, the mask being opened to correspond to openings of a part of the cells; supplying the plugging material having fluidity onto the mask or the same flat face as the surface of the mask; and moving a pressurizing member having a pressurizing face along the surface of the mask, the pressurizing face being arranged at an acute angle with respect to the surface of the mask to pressurize the plugging material, so that the pressurizing face pressurizes the plugging material and fills the plugging material into the cells of the honeycomb structure, to form the plugging portions.

In the honeycomb structure of the present invention, since the gap having a size of 20 μm or more is formed in a predetermined length between the plugging portion and the partition wall, the gap functions as a buffer zone of a thermal stress, and breakdown due to thermal shock does not easily occur. Moreover, since the length of the gap is set to a predetermined ratio or less of the length of the plugging portion, a sufficient bonding strength between the plugging portion and the partition wall can be obtained. That is, while sufficiently maintaining a collection efficiency and the bonding strength of a plugging portion, a resistance to the thermal shock is improved.

DESCRIPTION OF REFERENCE NUMERALS

1: honeycomb structure, 1s: side surface portion, 2: partition wall, 3: cell, 8: end face, 11: table part, 11h: through hole, 12: support base, 15: imaging device, 16: laser, 21: roller, 22: motor, 23: plugging material supply unit, 24: filling device, 24s: pressurizing face, 25: film, 27: peeling device, 29: drying device, 31: plugging material, 32: plugging portion, 34: gap, 35: endmost portion, 41: load transmission member, 41t: tip portion, and 42: moving mechanism.

DESCRIPTION OF THE PREFERRED EMBODIMENT

Hereinafter, an embodiment of the present invention will be described with reference to the drawings. The present invention is not limited to the following embodiment, and can be altered, modified or improved without departing from the scope of the present invention.

Figure 1:
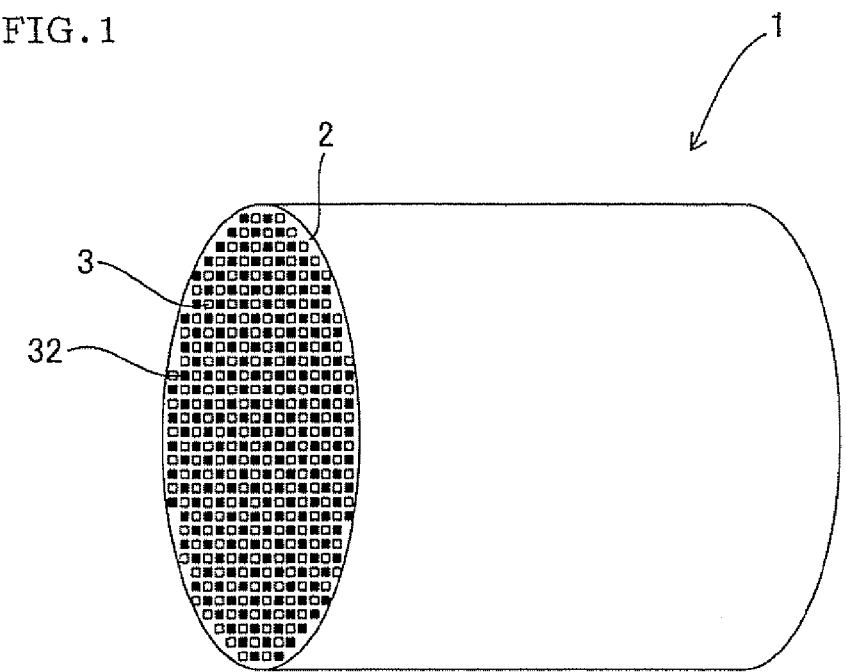
FIG. 1 is a perspective view showing one embodiment of a honeycomb structure of the present invention.
Figure 2:
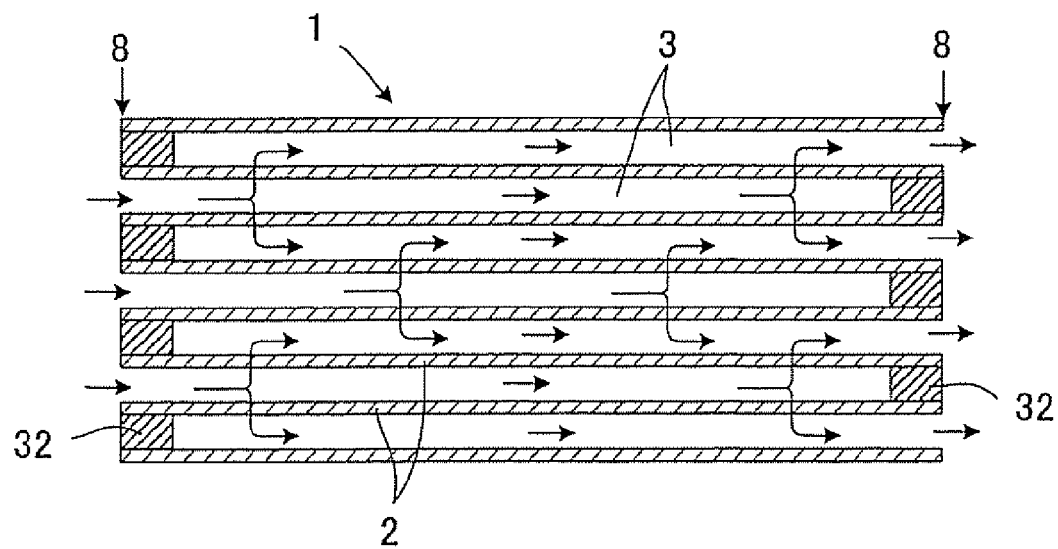
FIG. 2 is a sectional view for explaining the purification of an exhaust gas.

As shown in, for example, FIG. 1, a honeycomb structure 1 has porous partition walls 2, and a plurality of cells 3 extending through the honeycomb structure from one end face 8 to the other end face 8 in an axial direction, the cells being partitioned from one another by the partition walls 2, and the honeycomb structure is made of a ceramic material. Moreover, one end of the predetermined cell 3 is plugged with a plugging portion 32 made of a plugging material filled into the cell, and the other end of the remaining cell 3 opposite to the one end of the predetermined cell 3 is similarly plugged with a plugging portion 32. Furthermore, as shown in FIG. 2, an exhaust gas flows into a filter constituted of this plugged honeycomb structure 1 from the one end face 8, passes through the porous partition walls 2, and flows out of the other end face 8 to remove particles contained in the gas.

As the ceramic material forming a main body of the honeycomb structure 1, the material is preferably a ceramic material selected from the group consisting of cordierite, mullite, alumina, silicon carbide and a combination of them from the viewpoints of strength, thermal resistance and the like.

To obtain the honeycomb structure 1, a binder, an organic pore former, a surfactant, water and the like are added to the above raw materials, to prepare a kneaded clay having plasticity, and the clay is, for example, formed by extrusion into the columnar honeycomb structure 1 having a large number of cells 3 partitioned from one another by the partition walls 2 and extending through the structure in an axial direction. Then, the plugging portions 32 are formed in the ends of the cells 3.

Figure 3A:
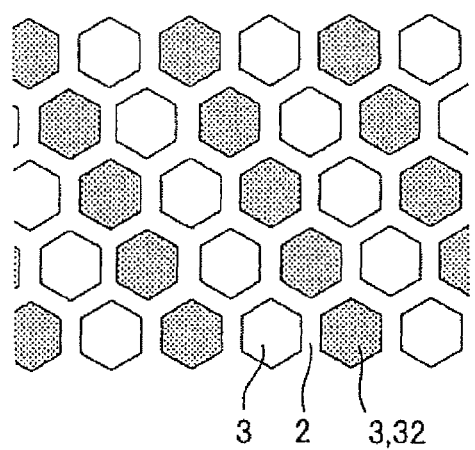
FIG. 3A is a diagram showing an end face structure of a honeycomb structure including hexagonal cells.
Figure 3B:
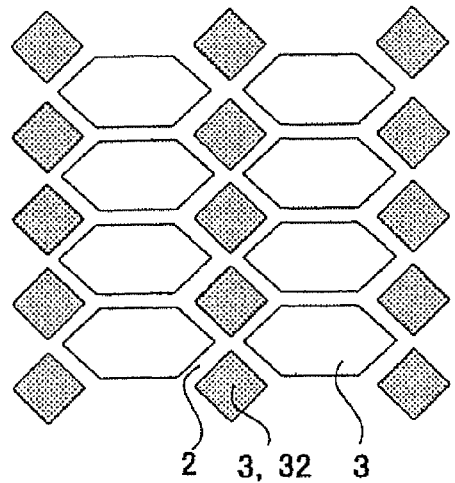
FIG. 3B is a diagram showing an end face structure of a honeycomb structure including a combination of quadrangular cells and hexagonal cells.
Figure 3C:
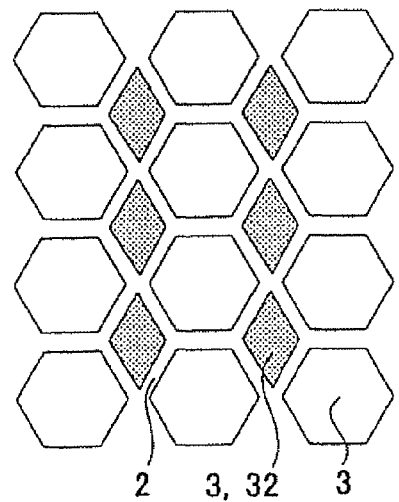
FIG. 3C is a diagram showing another end face structure of the honeycomb structure including the combination of the quadrangular cells and the hexagonal cells.
Figure 3D:
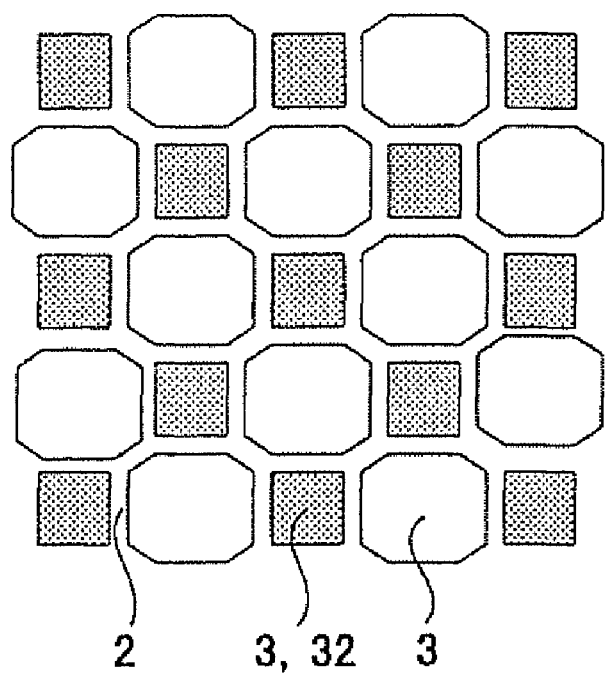
FIG. 3D is a diagram showing an end face structure of a honeycomb structure including a combination of quadrangular cells and octagonal cells.

The shape of the cells 3 of the honeycomb structure 1 is preferably at least one selected from the group consisting of a quadrangular shape shown in FIG. 1, a hexagonal shape shown in FIG. 3A, a combination of the quadrangular shape and the hexagonal shape shown in FIGS. 3B, 3C and a combination of the quadrangular shape and an octagonal shape shown in FIG. 3D. Alternatively, the shape may be a combination of circular shapes having different diameters, a combination of the circular shape and a polygonal shape or a combination of two types of polygonal shapes. In a case where the honeycomb structure of the combination of the quadrangular shape and the hexagonal shape or the octagonal shape is used as, for example, a diesel particulate filter (DPF) so that the surface of the honeycomb structure having a larger open area is disposed on an exhaust gas upstream side, more soot or ash can be collected, and the rise of a pressure loss during the use can be suppressed.

As the raw material of the plugging material for forming the plugging portions 32, there may preferably be used a material obtained by adding a dispersion medium such as water and the like, a binder, a pore former, a dispersant, a polysaccharide thickener or the like to ceramic powder of a cordierite material, mullite, alumina, spinel, silicon carbide, silicon nitride, lithium aluminum silicate or aluminum titanate and kneading the material.

As the binder, hydroxypropyl methyl cellulose, methyl cellulose, hydroxyethyl cellulose, carboxyl methyl cellulose, polyvinyl alcohol or the like may be used. They may be used alone or as a combination of two or more binders of them. There is not any special restriction on the pore former, as long as the pore former has properties that the pore former is flied and scattered to disappear by a firing step, but an inorganic substance such as cokes and the like, a polymer compound such as a resin balloon and an organic substance such as starch may be used alone or as a combination of them. As the dispersant, ethylene glycol, dextrin, fatty acid soap, polyalcohol or the like may be used. They may be used alone or as a combination of two or more binders of them. As the polysaccharide thickener, starch, grape sugar, maltose, millet jelly, oligosaccharide, xylose, other loses, glucose, trehalose, pullulan or the like may be used.

Figure 4:
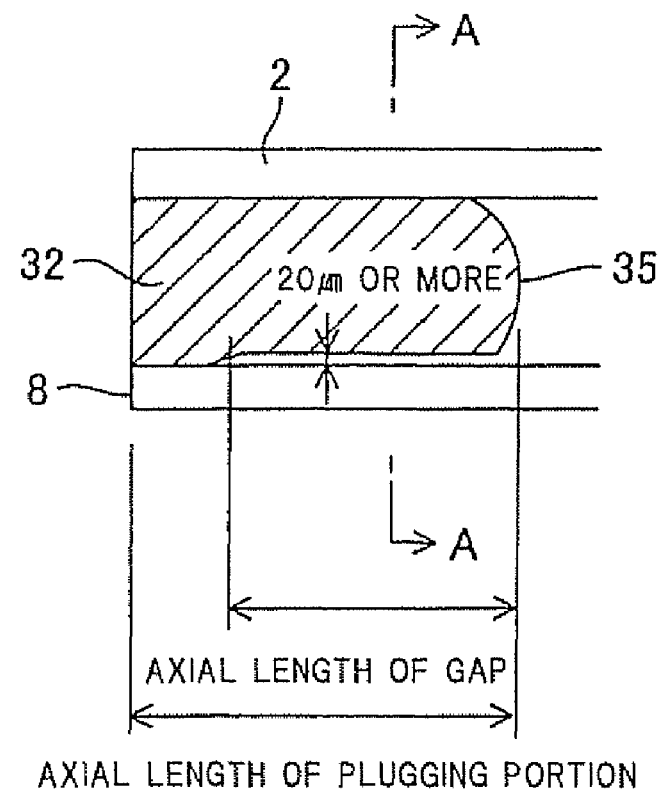
FIG. 4 is a sectional view of a plugging portion in an axial direction.
Figure 5:
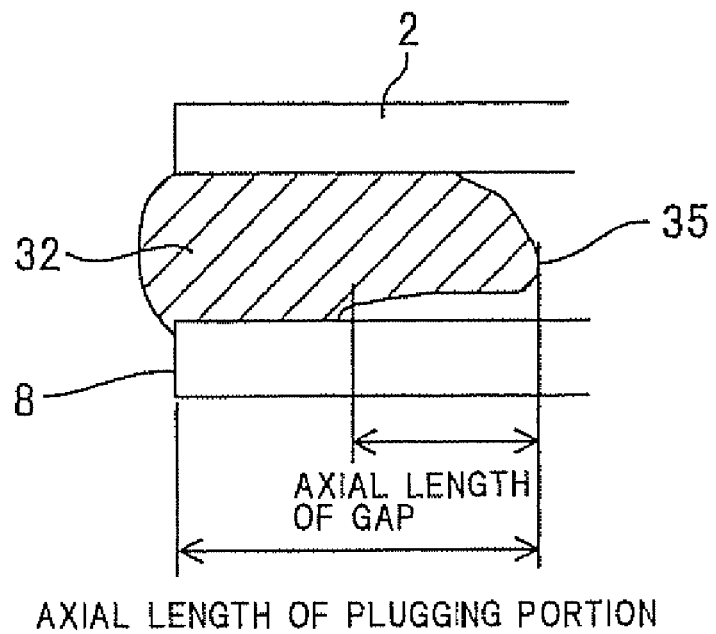
FIG. 5 is a sectional view of another plugging portion in the axial direction.
Figure 6:
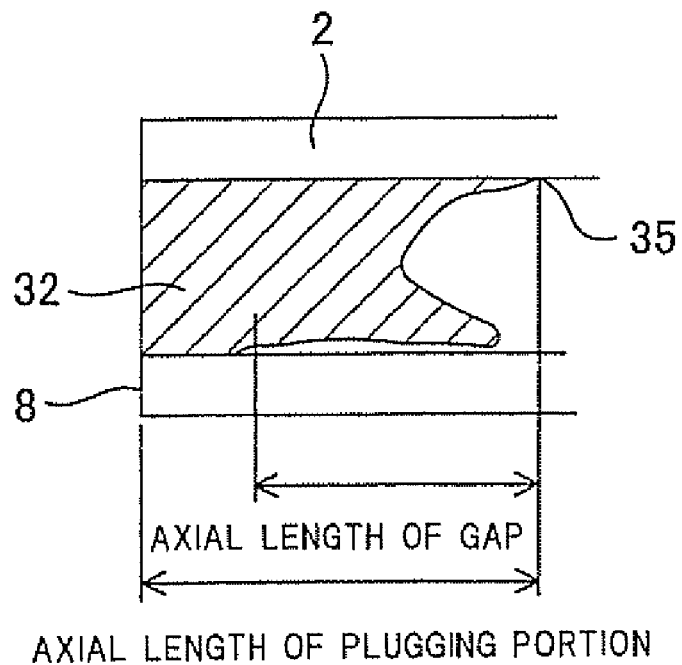
FIG. 6 is a sectional view of still another plugging portion in the axial direction.

The plugging portions 32 are formed using the above plugging material by a plugging method described later. FIGS. 4 to 6 show sectional views of the plugging portion 32 in the axial direction. The plugging portion 32 preferably has a length (an axial length) of 5 mm or less in the axial direction. When the plugging length of the plugging portion 32 exceeds 5 mm, a portion influenced by a thermal stress enlarges. Moreover, the control of gap dimensions during the formation of gaps is not easily performed. It is to be noted that the axial length of the plugging portion 32 is a length between the end face 8 and an endmost portion 35 of the plugging portion 32 as shown in FIG. 4. Moreover, even when the plugging portion 32 protrudes from the end face 8 as shown in FIG. 5, the axial length of the plugging portion is the length between the end face 8 of the cell 3 and the endmost portion 35 of the plugging portion 32. It is to be noted that the innermost portion of the plugging portion 32 in the axial direction. That is, when the plugging portion 32 is deformed as shown in FIGS. 5 and 6, the endmost portion is the innermost portion of the plugging portion. Moreover, the axial length of the plugging portion 32 is preferably 1 mm or more. When the axial length is less than 1 mm, the plugging portion 32 has an unfavorable strength.

In a part of the cells 3 provided with the plugging portions 32 of the honeycomb structure 1 of the present invention, a gap 34 having a size of 20 μm or more is formed between the plugging portion 32 and the partition wall 2 as shown in FIG. 4 to 6. The gap 34 having a size of 20 μm or more between the plugging portion 32 and the partition wall 2 is formed so that the axial length of the gap is 50% or more and less than 95% of the axial length of the plugging portion 32. It is to be noted that the axial length of the gap 34 is the length of a gap portion, having a size of a 20 μm or more, from the position of the endmost portion 35 in the axial direction.

Figure 7:
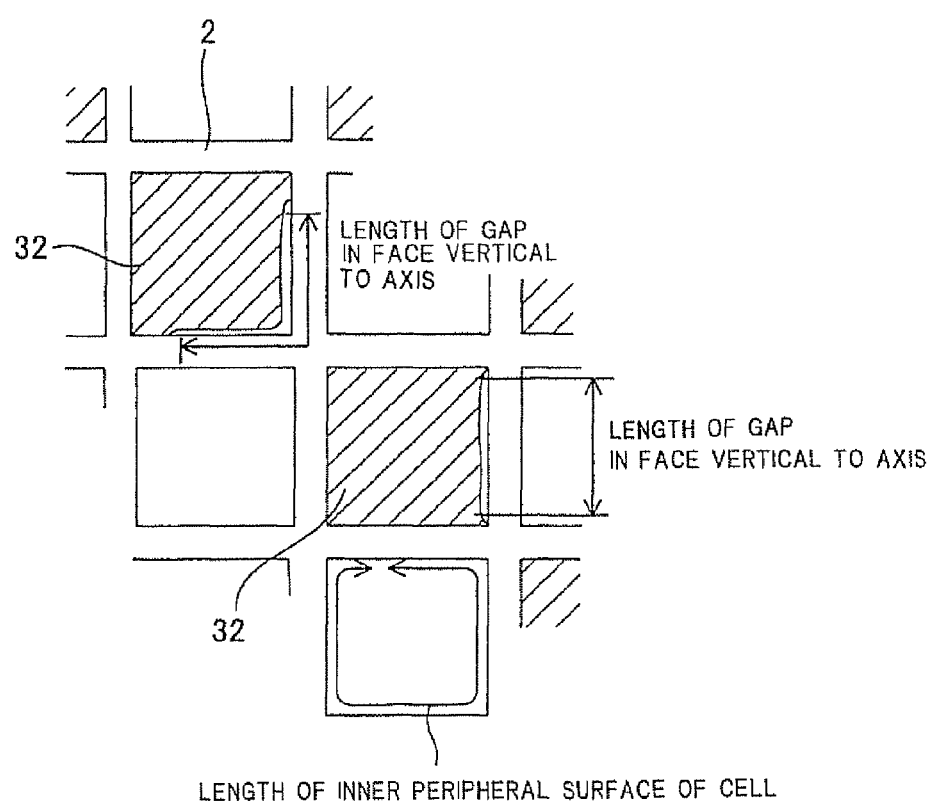
FIG. 7 is a sectional view of a face vertical to the axial direction in a depth position where gaps are formed.

FIG. 7 shows a sectional view cut along a face (also referred to as the face vertical to the axis) vertical to the axial direction in a depth position where the gaps 34 are formed (e.g., a section in a position A-A of FIG. 4). The gap 34 having a size of 20 μm or more between the plugging portion 32 and the partition wall 2 is formed in one side or two sides of the cell 3. FIG. 7 shows an example in which the gap is formed in one side and an example in which the gaps are formed in two sides. The length of the gap 34 in the face vertical to the axis is 20% or more and 50% or less of the length of the inner peripheral surface of the cell 3. Moreover, the gaps 34 are formed in at least ⅓ or more of all plugging portions 32.

Next, a manufacturing method of the honeycomb structure 1 of the present invention will be described. First, the kneaded clay made of the above raw material is, for example, formed by extrusion into the columnar honeycomb structure 1 having a large number of cells 3 partitioned from one another by the partition walls 2 and extending through the structure in the axial direction. Then, a mask is provided on the end face of the honeycomb structure 1 before forming the plugging portions 32, the mask having openings corresponding to openings of a part of the cells 3. A plugging material 31 having fluidity is supplied onto the mask or the same flat face as the surface of the mask, and a pressurizing member is moved along the surface of the mask, the pressurizing member having a pressurizing face 24s which is arranged at an acute angle with respect to the surface of the mask to pressurize the plugging material 31, so that the pressurizing face 24s pressurizes the plugging material 31 to fill the plugging material 31 into the cells 3 of the honeycomb structure 1.

A plugging method of the honeycomb structure 1 of the present invention will be described in more detail with reference to FIGS. 8 to 14. In particular, a manufacturing device and pressurizing/filling during plugging will be described with reference to FIGS. 8 to 10, and the flow of the plugging step will be described with reference to FIGS. 11 to 14.

A manufacturing device of the plugged honeycomb structure 1, for use in the plugging method of the present invention, includes a table part 11 having a through hole 11h into which the end of the honeycomb structure 1 is inserted, the honeycomb structure having porous partition walls 2 and a plurality of cells partitioned from one another by the partition walls 2 and extending thorough the structure from the one end face 8 to the other end face 8; positioning means for positioning the table part 11 and the honeycomb structure 1 to hold the honeycomb structure while the end of the structure is inserted into the through hole 11h of the table part 11; plugging material supply means for supplying the plugging material 31 having fluidity onto a mask or the table part 11 while the end face 8 of the honeycomb structure 1 is provided with the mask having openings corresponding to openings of a part of the cells 3; and pressurizing means having the pressurizing face 24s arranged at an acute angle with respect to the surface of the mask to pressurize the plugging material 31, and moving means for moving along the table part 11.

Moreover, the device is equipped with a roller 21 as film attaching means, and a film 25 can be attached to the table part 11 and the end face 8 of the honeycomb structure 1 by the roller 21. Furthermore, as the positioning means for positioning the table part 11 and the honeycomb structure 1, a motor 22 is connected to the table part 11 to raise or lower the table part 11. Alternatively, the motor 22 is connected to a support base 12 to raise or lower the support base 12 on which the honeycomb structure 1 is mounted. As hole making means for making holes in the film 25, laser 16 is disposed.

Then, the plugging material 31 is supplied onto the mask of the honeycomb structure 1 positioned with respect to the table part 11, or the table part 11, and then the pressurizing means moves along the table part 11, thereby pressurizing the plugging material 31 supplied onto the mask by the pressurizing face 24s to fill the plugging material 31 into the cells 3 of the honeycomb structure 1.

The pressurizing means has a pressurizing mechanism for moving the pressurizing face 24s in a vertical direction with respect to the surface of the mask, and a driving mechanism for moving the pressurizing face 24s along the surface of the mask (the film 25), and specifically includes a filling device 24. When the filling device 24 vertically or horizontally moves in FIG. 8, the plugging material 31 is pressurized and filled into the cells 3.

Figure 8:
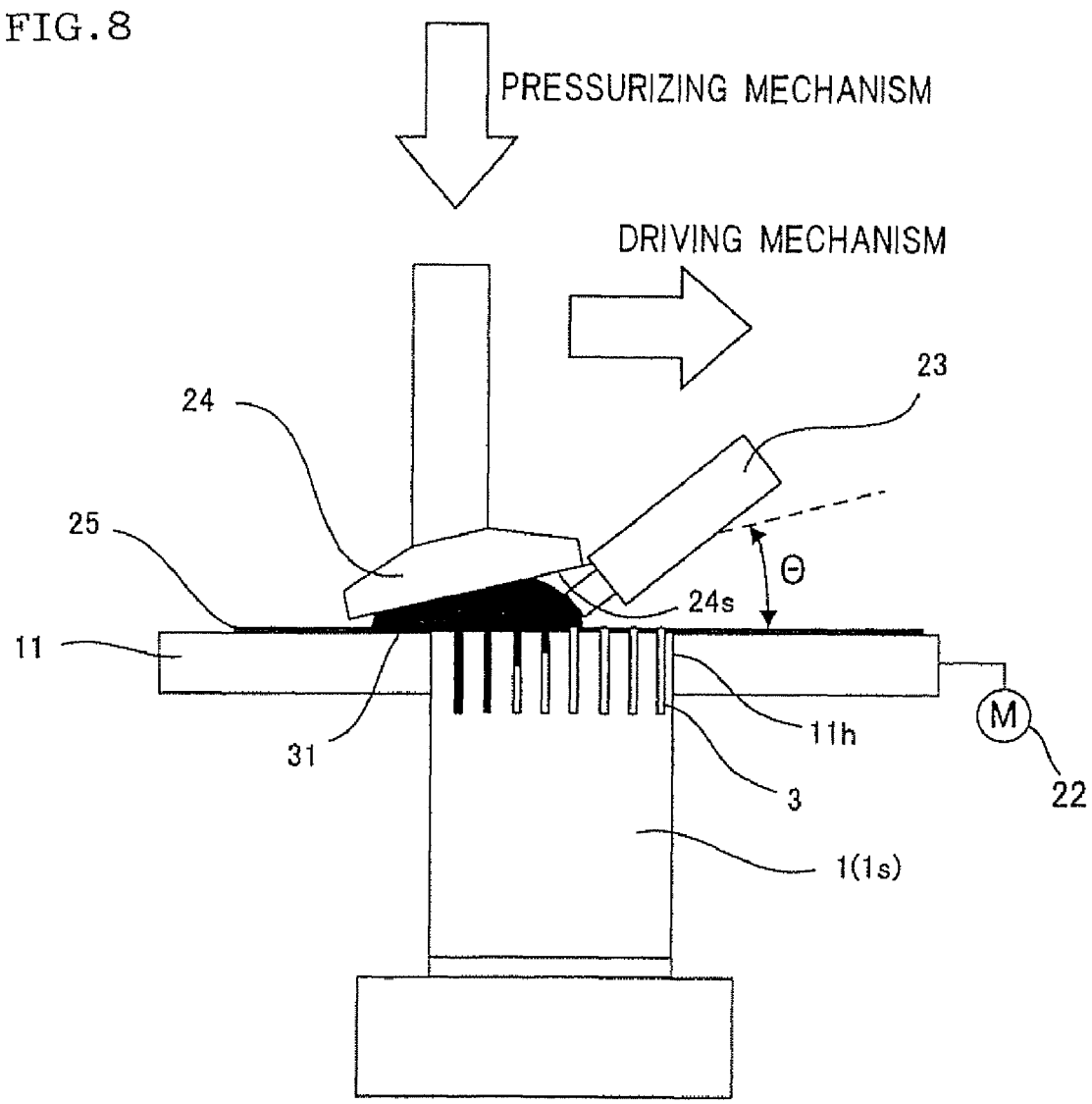
FIG. 8 is a diagram showing an outline of pressurizing/filling.
Figure 10:
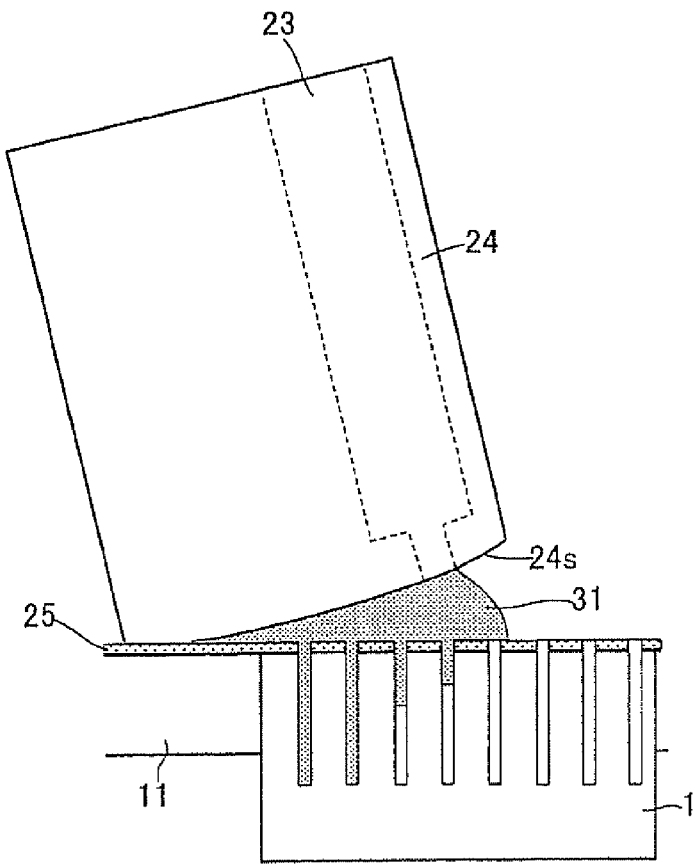
FIG. 10 is a diagram showing another embodiment of a filling device.

As shown in FIG. 8, a plugging material supply unit 23 may be disposed separately from the filling device 24, but as shown in FIG. 10, the plugging material supply unit may be disposed in the filling device 24 as the pressurizing means so that the supply unit moves integrally with the pressurizing means.

When the pressurizing face 24s is a flat face as shown in FIG. 8, an angle θ formed by the pressurizing face 24s with respect to the surface of the mask (the film 25) is set to an acute angle. Furthermore, the pressurizing face 24s may be made of an elastic member so that the pressurizing face is pressed onto the mask and bent to partially come in face contact with the mask. When the plugging unit 24 is made of, for example, a metal and a rubber sheet, a PET film or the like is attached to the metal, the rubber sheet, the PET film or the like forms the pressurizing face 24s.

Figure 9:
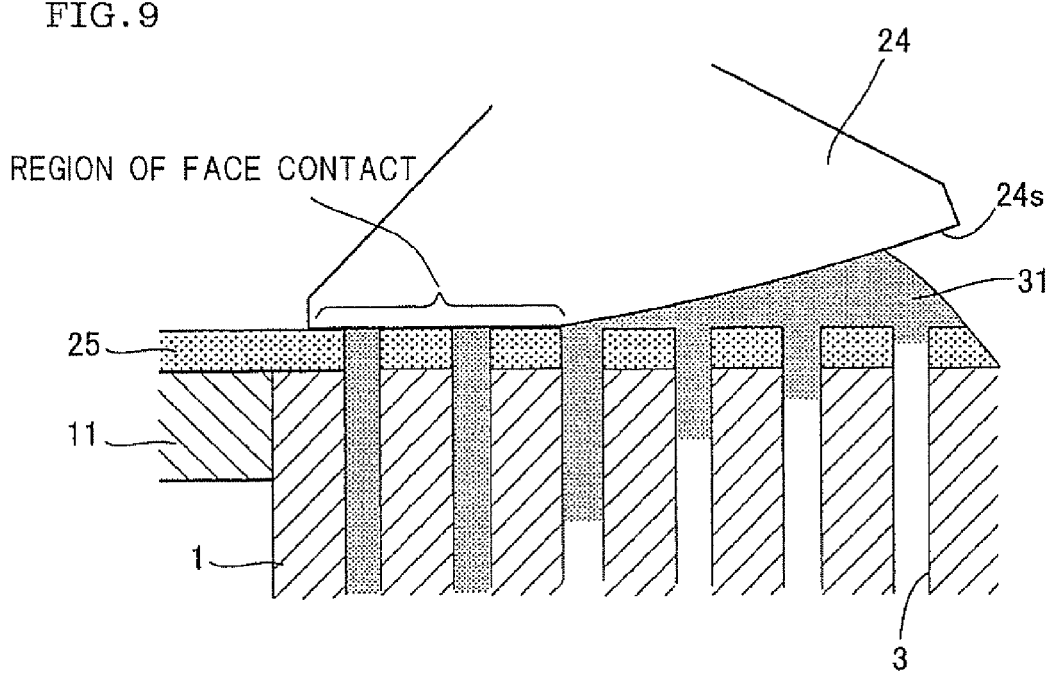
FIG. 9 is a diagram showing the pressurizing/filling by face contact.

Moreover, as shown in FIG. 9, a region of a part of the pressurizing face 24s is brought into face contact with the mask via the plugging material 31, and moved along the mask, to pressurize the plugging material 31 toward the cells 3. Moreover, the excessive plugging material 31 is pushed outward in a movement direction. Furthermore, while forming the region of the face contact, the material may be pressurized and filled into the cells 3.

In a constitution in which the pressurizing face 24s is the flat face as shown in FIG. 8, the pressurizing face 24s preferably forms an acute angle, more specifically an angle of 2 degrees or more and 60 degrees or less with respect to the surface of the mask (the film 25). In this case, the plugging material 31 can be pressurized and filled into the cells 3.

Alternatively, as shown in FIG. 10, the pressurizing face 24s may be a curved face protruding toward the mask. In such a constitution, the plugging material 31 is easily pressurized and filled into the cells 3.

Heretofore, the plugging material 31 has been received in a container, and leveled, and the honeycomb structure 1 is immersed into the material and plugged. However, by the above plugging, a time required for the plugging can be shortened, and a manufacturing cost can be decreased. Moreover, the material is filled while the pressurizing face is brought into face contact, and hence fluctuations of a depth to be filled decrease. Furthermore, even in the case of shallow plugging, the plugging material 31 is securely filled by the pressurizing face 24s, and hence a filling failure is not easily generated. In addition, when the plugging material 31 is pressurized and filled by the method shown in FIGS. 8 to 10, the plugging portions 32 each including the above gap having a size of 20 µm or more are formed. The width, length and direction of each gap 34 can be regulated in accordance with the pressurizing face angle (θ) or the pressurizing force of the pressurizing face 24s of the filling device 24, the moving direction, the speed or the number of moving times of the filling device 24, or the viscosity of the plugging material. In particular, the gaps 34 are easily formed along the moving direction of the filling device 24.

Next, a specific plugging step flow will be described with reference to FIGS. 11 to 14. First, as shown in Step 1 of FIG. 11, dust attached to the end face 8 of the honeycomb structure 1 having porous partition walls 2 and a plurality of cells 3 partitioned from one another by the partition walls 2 and extending through the structure from the one end face 8 to the other end face 8 is removed by blowing air, and the dust is collected to clean the end face 8.

Figure 11:
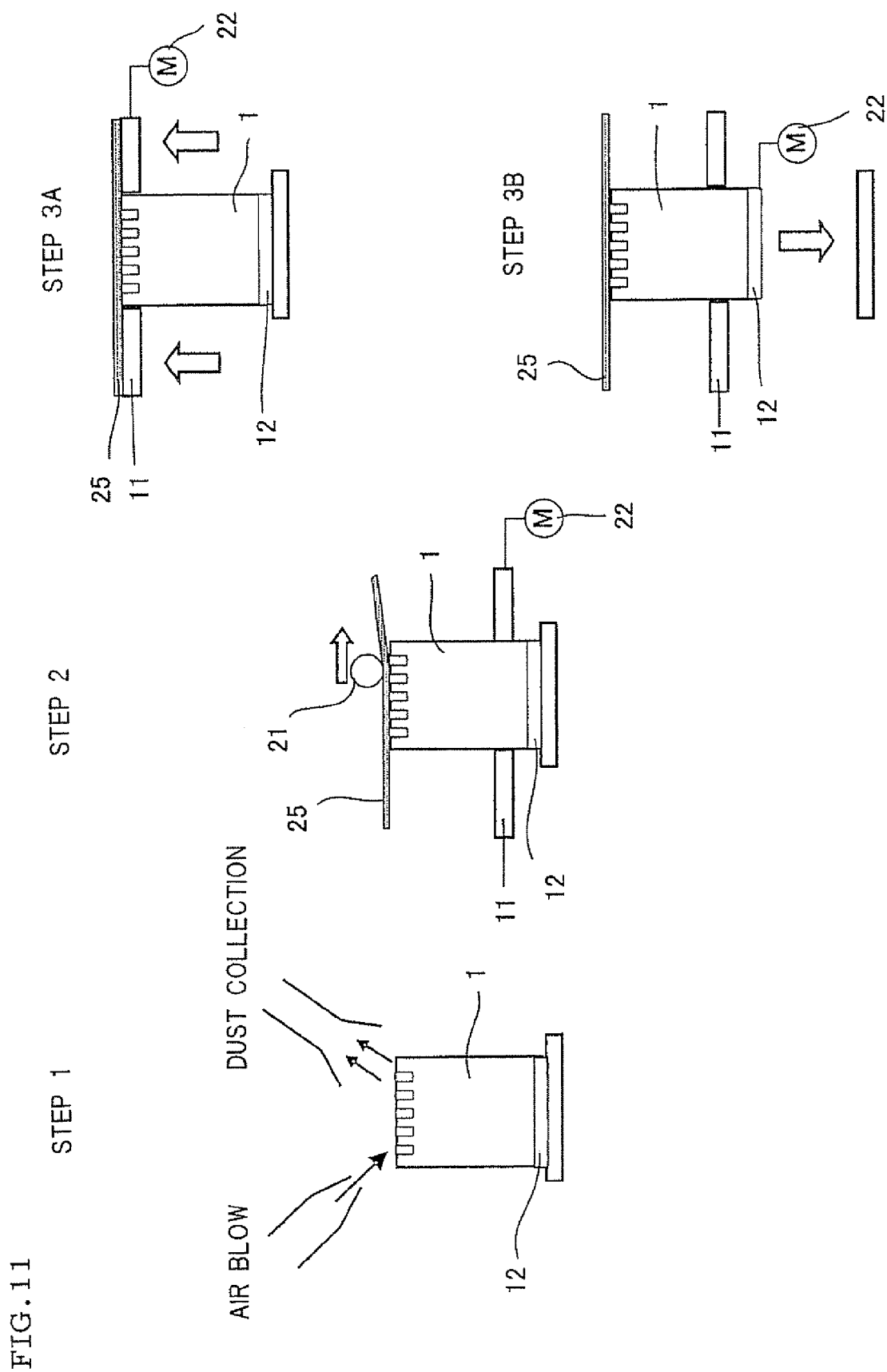
FIG. 11 is a diagram showing a plugging step.

Then, as shown in Step 2 of FIG. 11, while a part of the honeycomb structure 1 is inserted into the through hole 11h of the table part 11, the film 25 is attached to the end face 8 of the honeycomb structure 1 so that a side surface portion Is of the honeycomb structure 1 is not covered. At this time, specifically, the film 25 may be pressed by the roller 21 or the like, and brought into close contact with the end face 8.

Subsequently, as shown in Step 3A of FIG. 11, while the honeycomb structure 1 provided with the film 25 is inserted into the through hole 11h, the table part 11 is raised by the motor 22 to position and hold the table part 11 and the honeycomb structure 1 so that the film 25 attached to the end face 8 is flattened and so that the remaining portion of the film is attached to the table part 11.

Alternatively, as shown in Step 3B of FIG. 11, the support base 12 on which the honeycomb structure 1 is mounted may be lowered to attach to the table part 11, the flattened film 25 attached to the end face 8.

Figure 12:
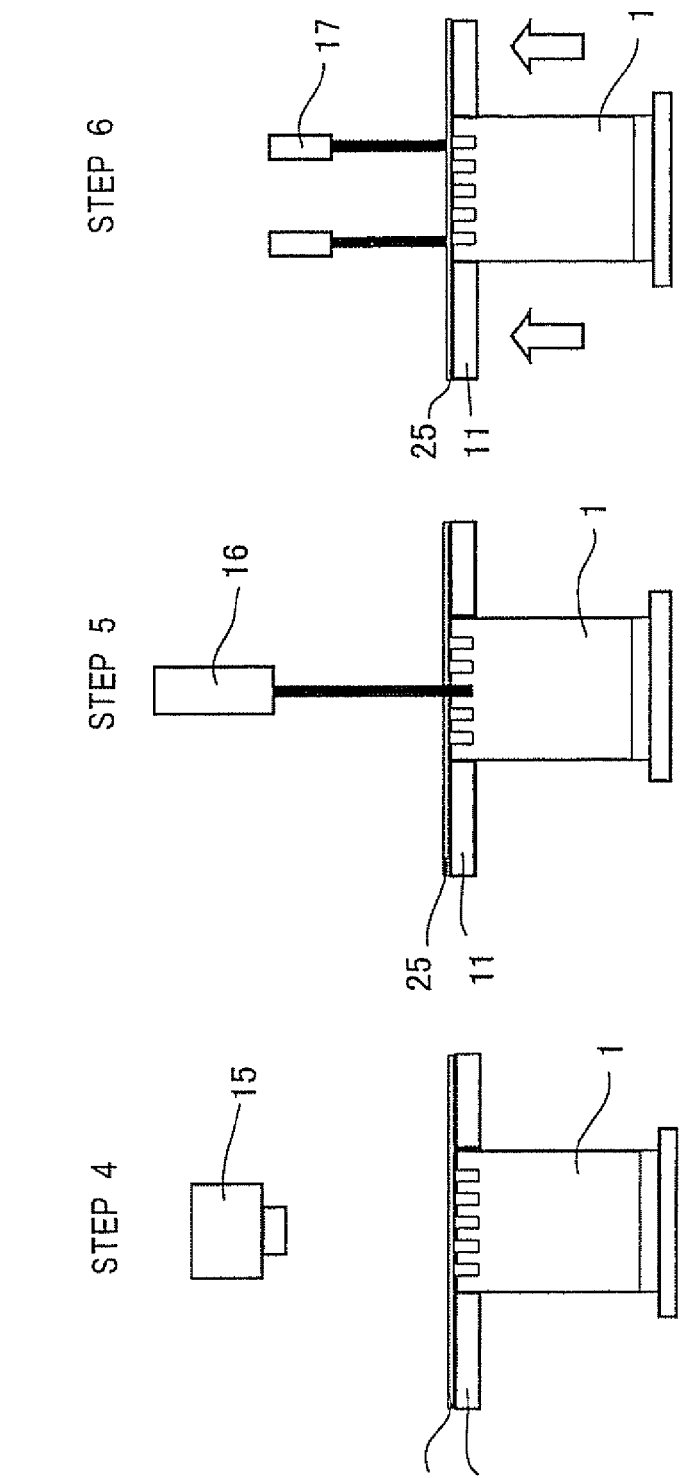
FIG. 12 is a diagram showing the plugging step following FIG. 11.

Next, as shown in Step 4 of FIG. 12, the end face 8 of the honeycomb structure 1 is imaged by an imaging device 15 to acquire image data capable of specifying the shapes and the positions of the cells 3 to be plugged and the cells 3 which are not to be plugged. There is not any special restriction on the imaging device 15 for imaging the end face 8 of the honeycomb structure 1, but, for example, a charge-coupled device (CCD) camera, an X-ray computed tomography (CT) scanner or the like may preferably be used.

Then, as shown in Step 5 of FIG. 12, holes opened to correspond to the openings of a part of the cells 3 are formed in the film 25 by the laser 16 based on the image data acquired in the previous step, to constitute a mask. Therefore, the imaging device 15 and the laser 16 constitute hole making means.

Afterward, as shown in Step 6 of FIG. 12, the honeycomb structure 1 is positioned in a predetermined position by use of a sensor 17 (e.g., an infrared sensor) so that the upper flat face of the table part 11 forms the same flat face as the end face 8 of the honeycomb structure 1.

Figure 13:
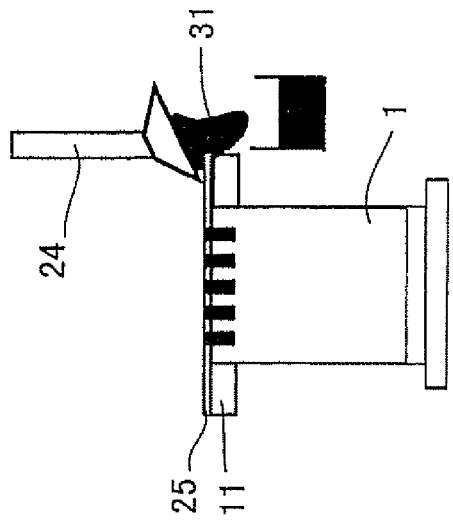
FIG. 13 is a diagram showing the plugging step following FIG. 12.
Figure 13:
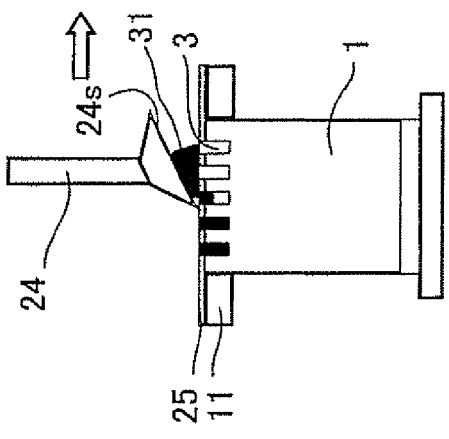
Figure 13:
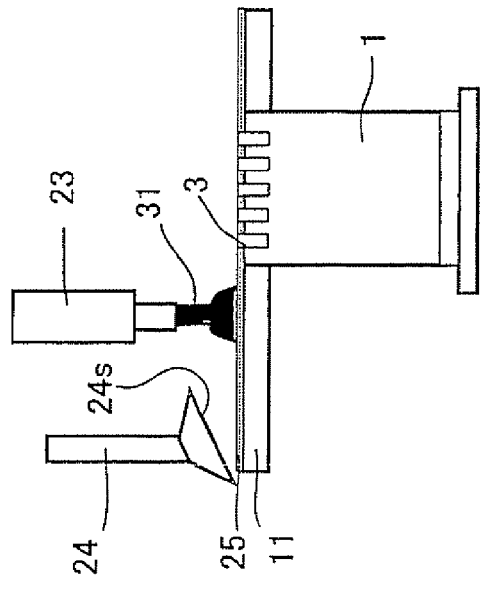

Next, as shown in Step 7 of FIG. 13, the plugging material 31 (a slurry) having fluidity is supplied onto the holed mask (the film 25) or the table part 11 by the plugging material supply unit 23 as plugging material supply means. It is to be noted that the plugging material 31 used for the plugging is, for example, a material obtained by adding water as a dispersion medium to a mixed material of ceramic powder, a binding agent and a deflocculation agent to mix the same. Specifically, the material is preferably a ceramic material selected from the group consisting of cordierite, mullite, alumina, silicon carbide and a combination of them.

Then, as shown in Step 8 of FIG. 13, the plugging material 31 supplied onto the mask or the table part 11 is filled into the cells 3 by the filling device 24 as pressurizing means. The filling device 24 specifically has the pressurizing face 24s arranged at the acute angle with respect to the surface of the mask to pressurize the plugging material 31, and moving means which moves along the table part 11. After supplying the plugging material 31 onto the mask of the honeycomb structure 1 positioned with respect to the table part 11 or the table part 11, the filling device 24 is moved along the table part 11. In consequence, the plugging material 31 supplied onto the mask is pressurized by the pressurizing face 24s to fill the plugging material 31 into the cells 3 of the honeycomb structure 1. At this time, as described above, the region of a part of the pressurizing face 24s is brought into face contact with the mask via the plugging material 31 and moved along the mask, to pressurize the plugging material 31 toward the cells. Moreover, the excessive plugging material 31 is pushed outwards in the moving direction. Furthermore, it is advisable that the material be pressurized and filled into the cells while forming the region of the face contact. When the region of a part of the pressurizing face 24s comes in face contact with the mask, the plugging material 31 is securely filled into the cells. On the other hand, if the plugging material 31 is not pressurized, it is difficult to fill a fixed amount or more of the plugging material 31 into the cells, which results in insufficient plugging.

Furthermore, after filling the plugging material 31 into the cells 3, as shown in Step 9 of FIG. 13, the filling device 24 is moved out of the table part 11 to remove the extra plugging material 31 from the table part 11.

Figure 14:
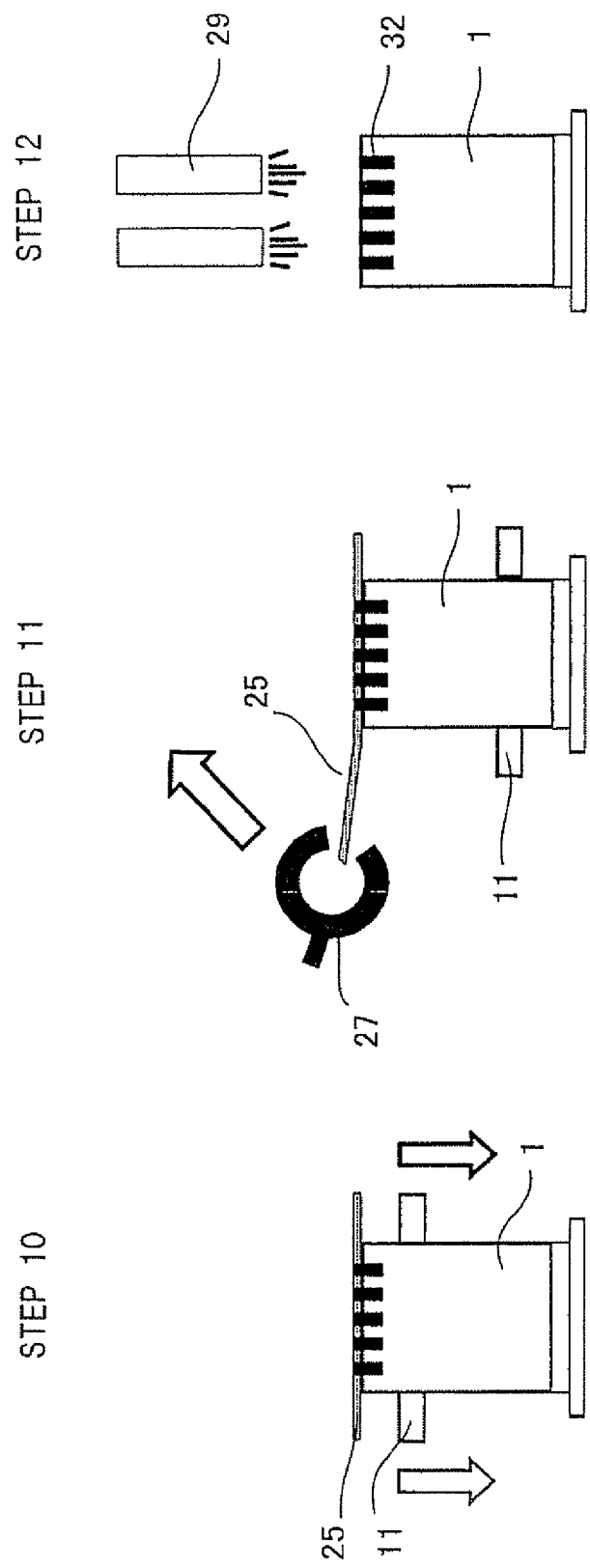
FIG. 14 is a diagram showing the plugging step following FIG. 13.

Next, as shown in Step 10 of FIG. 14, the table part 11 is lowered to peel the table part 11 and the film 25 from each other. Then, as shown in Step 11 of FIG. 14, the mask attached to the end face 8 is peeled by a peeling device 27. As shown in Step 12 of FIG. 14, the honeycomb structure 1 is dried by a drying device 29 as drying means, to complete the honeycomb structure 1 provided with the plugging portions 32.

EXAMPLES

Hereinafter, the present invention will be described in more detail in accordance with examples, but the present invention is not limited to the following examples.

As a raw material, a cordierite forming material containing talc, kaolin and alumina as main materials was blended with water and a binder, and a dispersed, mixed and kneaded forming material was extruded into a columnar shape by a clay kneader. The material was formed by extrusion by an extrusion forming machine to obtain a formed honeycomb article. Then, the resultant formed honeycomb article was dried, and then cut into a predetermined length, to obtain the dried honeycomb article. In examples and comparative examples, in a combination of a quadrangular shape and a hexagonal shape, the quadrangular shape was substantially a square shape (FIG. 3B).

Next, a plurality of cells in both end faces of the resultant dried honeycomb article were alternately plugged by the above plugging step, and then the article was fired to obtain the fired honeycomb article. Then, the outer peripheral wall and the outermost periphery of the resultant fired honeycomb article were ground and removed, and then the outer periphery of the article was coated with a ceramic coating material to form a new outer peripheral wall, thereby obtain a cordierite honeycomb structure.

By the above method, the honeycomb structure was manufactured. As to the shape, dimension and the like of the fired article, for example, the columnar (an outer diameter: 165 mm, a length: 152 mm) honeycomb structure having a quadrangular sectional cell shape had a partition wall thickness of 0.3 mm, a reference cell density of 300 cpsi (46.5 cells/cm$^2$) and a plugging depth of 5 mm. In the examples and the comparative examples, the width, length and direction of each gap 34 were changed in accordance with a squeegee (filling device 24) pressurizing face angle, a pressurizing force, a moving direction, the number of moving time or the viscosity of a plugging material.

(Measurement Method of Gap)

By the above method, the honeycomb structure provided with plugging portions 32 was cut, and observed/measured by SEM (It is to be noted that only to check the presence of a gap, light is applied to one honeycomb end face, and the opposite honeycomb end face may be checked. If the gap is present, the light is transmitted.).

(Bonding Strength of Plugging Portion)

Figure 15:
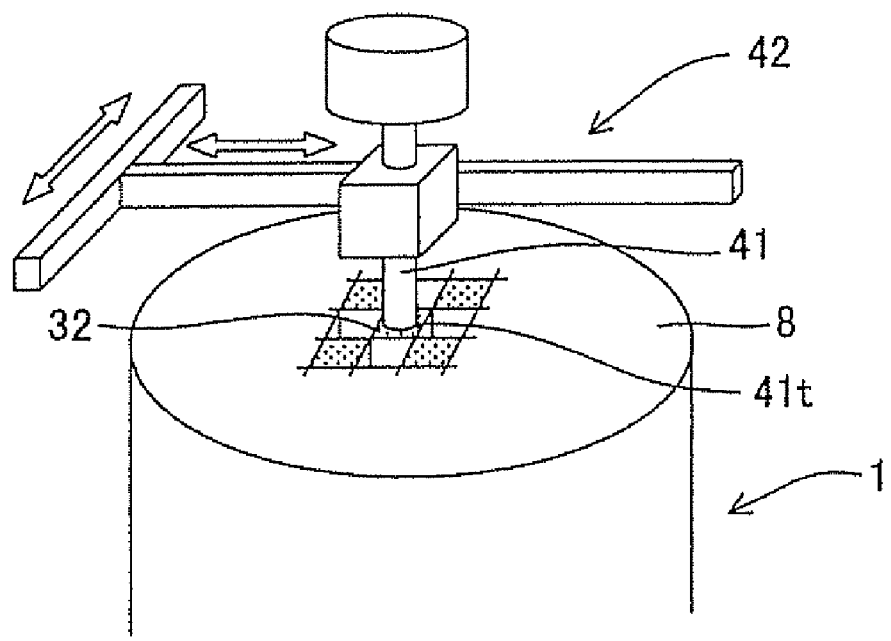
FIG. 15 is a schematic diagram of a device for checking the bonding strength of the plugging portion.

The bonding strength of the plugging portion was checked using a device having a constitution shown in FIG. 15. This device includes a load transmission member 41 which applies a load to a plugging portion 32 from an end face 8 of a honeycomb structure 1, and a moving mechanism 42 capable of moving this load transmission member 41 in parallel with the end face 8 of the honeycomb structure 1. In this constitution, a tip portion 41t of the load transmission member 41 is aligned with the position of the plugging portion 32 whose bonding strength is to be checked, by the moving mechanism 42, and the load can be applied to the plugging portion 32 in a vertical direction (an axial direction). As the evaluation of the bonding strength, when the load applied to the plugging portion 32 is gradually increased in the device, the bonding strength is smaller than a partition wall strength and the plugging portion 32 is detached from a partition wall 2, the result is a bonding failure (a cross). When the plugging portion 32 is not detached from the partition wall 2 and the partition wall 2 breaks down, the result is satisfactory bonding (a circle).

(Isostatic Strength)

An isostatic strength is represented by a pressurizing pressure value at a time when a carrier breaks down, and is defined by a method described in JASO standard M505-87 as the automotive standard issued by Society of Automotive Engineers of Japan. In this test, a sample (the honeycomb structure) is put in a rubber cylindrical container, and closed with an aluminum plate lid to perform isostatic pressurizing compression in water. Any significant difference was not recognized between the example and a conventional honeycomb structure (a honeycomb structure had the same cell shape, an equal partition wall thickness, the equal number of cells and an equal length of a plugging portion in a flow path direction (an axial direction) and any gap was not made between each plugging portion and each partition wall) (not described in a table). Even if the gap was formed, any problem was not generated in the strength.

(Electric Furnace Spalling Test)

A thermal shock resistance was evaluated by an electric furnace spalling test, and the evaluation was performed by a method described in car standard "Test Method of Ceramic Monolith Carrier for Car Exhaust Gas Purification Catalyst" M505-87 (Society of Automotive Engineers of Japan). As to a thermal shock resistant temperature, the temperature of an electric furnace was raised at the rate of 25° C. in each step, and the maximum temperature at which any breakdown such as crack was not generated in the honeycomb structure was obtained as the thermal shock resistant temperature. In the electric furnace spalling test, as compared with the conventional honeycomb structure (the honeycomb structure had the same cell shape, the equal partition wall thickness, the equal number of the cells and the equal length of the plugging portion in the flow path direction (the axial direction) and any gap was not made between each plugging portion and each partition wall), when there was not any significant difference in the thermal shock resistant temperature, the result was represented by a triangle. When the temperature was raised as much as 25° C., the result was represented by a is circle. When the temperature was raised as much as 50° C. or more, the result was represented by a double circle.

Conversely, when the temperature lowered, the result was represented by a cross (the number of test samples was three for each level).

(PM Number (Collection Performance))

On conditions that the concentration of soot (particulate matter) was 1 mg/m$^3$, an exhaust gas temperature was 200° C. and an exhaust gas flow rate was 2.4 Nm$^3$/min, an exhaust gas from a light oil burner was allowed to flow through the honeycomb structure, and in an initial state before the soot was accumulated in the honeycomb structure, the number of soot particles on an upstream side (before the exhaust gas flowed into the honeycomb structure) and the number of the soot particles on a downstream side (after the exhaust gas flowed out of the honeycomb structure) were measured. The number of the soot particles was measured by counting the soot particles by use of a scanning mobility analyzer (SMPS) manufactured by TSI Co., Ltd. When an initial collection efficiency was 80% or more, the result was regarded as successful. As compared with the conventional honeycomb structure (the honeycomb structure had the same cell shape, the equal partition wall thickness, the equal number of the cells and the equal length of the plugging portion in the flow path direction (the axial direction) and any gap was not made between each plugging portion and each partition wall), when there was not any significant difference in the counted number, the result was represented by a circle. When the number increased (more soot leaked as compared with the conventional honeycomb structure), the result was represented by a cross. The above results are shown in Tables 1 and 2.

TABLE 1

|  | Example 1 | Example 2 | Example 3 | Example 4 | Example 5 | Example 6 |
|---|---|---|---|---|---|---|
| Cell shape | Quadrangle | Quadrangle | Quadrangle | Quadrangle | Quadrangle | Quadrangle |
| Partition wall thickness (mm) | 0.3 | 0.3 | 0.3 | 0.3 | 0.3 | 0.3 |
| Cell number (cells/cm$^2$) | 46.5 | 46.5 | 46.5 | 46.5 | 46.5 | 46.5 |
| Plugging portion/length in flow path direction (mm) | 3 | 3 | 3 | 3 | 3 | 8 |
| Length of gap having size of 20 μm or more in flow path direction between plugging portion and partition wall (mm) *1 | 2.8 | 2 | 1.5 | 2.7 | 1.5 | 7.2 |
| Ratio of length of gap having size of 20 μm or more in direction vertical to flow path between plugging portion and partition wall with reference to peripheral length of cell wall surface (length of inner peripheral surface of cell) (%) *1 | 25 | 30 | 20 | 50 | 40 | 25 |
| Ratio of cells provided with gaps (%) | 33 | 35 | 35 | 95 | 90 | 90 |
| Arrangement of cells provided with gaps *3 | Random | Outer peripheral portion | Random | Random | Random | Outer peripheral portion |
| Gap direction *2 | Same | Random | Random | Same | Same | Random |
| Bonding strength of plugging portion | ○ | ○ | ○ | ○ | ○ | ○ |
| Electric furnace spalling test result | ○ | ○ | ○ | ⊚ | ⊚ | ⊚ |
| PM number (collection performance) | ○ | ○ | ○ | ○ | ○ | ○ |

|  | Example 7 | Example 8 | Example 9 | Example 10 | Example 11 |
|---|---|---|---|---|---|
| Cell shape | Quadrangle | Hexagon | Hexagon | Quadrangle + hexagon | Quadrangle + octagon |
| Partition wall thickness (mm) | 0.3 | 0.25 | 0.25 | 0.25 | 0.25 |
| Cell number (cells/cm$^2$) | 46.5 | 46.5 | 46.5 | 46.5 | 46.5 |
| Plugging portion/length in flow path direction (mm) | 8 | 5 | 5 | 5 | 5 |
| Length of gap having size of 20 μm or more in flow path direction between plugging portion and partition wall (mm) *1 | 4.3 | 4.5 | 3 | 4.6 | 4.3 |
| Ratio of length of gap having size of 20 μm or more in direction vertical to flow path between plugging portion and partition wall with reference to peripheral length of cell wall surface (length of inner peripheral surface of cell) (%) *1 | 45 | 25 | 40 | 35 | 40 |
| Ratio of cells provided with gaps (%) | 80 | 55 | 45 | 55 | 53 |
| Arrangement of cells provided with gaps *3 | Random | Outer peripheral portion | Random | Random | Random |
| Gap direction *2 | Random | Same | Same | Same | Same |
| Bonding strength of plugging portion | ○ | ○ | ○ | ○ | ○ |
| Electric furnace spalling test result | ⊚ | ⊚ | ○ | ○ | ⊚ |
| PM number (collection performance) | ○ | ○ | ○ | ○ | ○ |

Honeycomb size: 165 mmΦ × 152 mmL

TABLE 2

|  | Comparative Example 1 | Comparative Example 2 | Comparative Example 3 | Comparative Example 4 | Comparative Example 5 | Comparative Example 6 |
|---|---|---|---|---|---|---|
| Cell shape | Quadrangle | Quadrangle | Quadrangle | Quadrangle | Quadrangle | Hexagon |
| Partition wall thickness (mm) | 0.3 | 0.3 | 0.3 | 0.3 | 0.3 | 0.25 |
| Cell number (cells/cm2) | 46.5 | 46.5 | 46.5 | 46.5 | 46.5 | 46.5 |
| Plugging portion/length in flow path direction (mm) | 3 | 8 | 3 | 3 | 8 | 5 |
| Length of gap having size of 20 μm or more in flow path direction between plugging portion and partition wall (mm) *1 | 0 | 0 | 1.1 | 1.5 | 8 | 0 |

TABLE 2-continued

|  |  |  |  |  |  |  |
|---|---|---|---|---|---|---|
| Ratio of length of gap having size of 20 μm or more in direction vertical to flow path between plugging portion and partition wall with reference to peripheral length of cell wall surface (length of inner peripheral surface of cell) (%) *1 | 0 | 0 | 25 | 30 | 55 | 0 |
| Ratio of cells provided with gaps (%) | 0 | 0 | 30 | 25 | 45 | 0 |
| Arrangement of cells provided with gaps *3 | — | — | Random | Random | Random | — |
| Gap direction *2 | — | — | Random | Random | Random | — |
| Bonding strength of plugging portion | ◯ | ◯ | ◯ | ◯ | x | ◯ |
| Electric furnace spalling test result | Δ | Δ | Δ | Δ | ◯ | Δ |
| PM number (collection performance) | ◯ | ◯ | ◯ | ◯ | x | ◯ |

|  | Comparative Example 7 | Comparative Example 8 | Comparative Example 9 | Comparative Example 10 | Comparative Example 11 |
|---|---|---|---|---|---|
| Cell shape | Hexagon | Quadrangle + hexagon | Quadrangle + hexagon | Quadrangle + hexagon | Quadrangle + hexagon |
| Partition wall thickness (mm) | 0.25 | 0.25 | 0.25 | 0.25 | 0.25 |
| Cell number (cells/cm2) | 46.5 | 46.5 | 46.5 | 46.5 | 46.5 |
| Plugging portion/length in flow path direction (mm) | 5 | 5 | 5 | 5 | 5 |
| Length of gap having size of 20 μm or more in flow path direction between plugging portion and partition wall (mm) *1 | 5 | 0 | 5 | 0 | 5 |
| Ratio of length of gap having size of 20 μm or more in direction vertical to flow path between plugging portion and partition wall with reference to peripheral length of cell wall surface (length of inner peripheral surface of cell) (%) *1 | 25 | 0 | 55 | 0 | 25 |
| Ratio of cells provided with gaps (%) | 60 | 0 | 35 | 0 | 40 |
| Arrangement of cells provided with gaps *3 | Random | — | Random | — | Random |
| Gap direction *2 | Random | — | Random | — | Random |
| Bonding strength of plugging portion | ◯ | ◯ | x | ◯ | ◯ |
| Electric furnace spalling test result | ◯ | Δ | ◯ | Δ | ◯ |
| PM number (collection performance) | x | ◯ | x | ◯ | x |

Honeycomb size: 165 mmΦ × 152 mmL

It is to be noted that in Tables 1 and 2, *1 is an average value of 30 cells sampled at random. In gap direction *2, when a half or more of the gaps have the same direction, the result is represented by "same". When the gaps less than the half have the same direction, the result is represented by "random". In the arrangement of the gap cells *3, the outer peripheral portion is a region outside a circle having a radius of ½ of a radius of a honeycomb section from the center thereof (or a region outside (on the outer peripheral side of) a distance of ½ of a distance from the gravity center of the honeycomb section to the outermost periphery thereof). Moreover, the term "random" indicates a case where the cells provided with the gaps are substantially equally arranged in the honeycomb end faces irrespective of regularity of the arrangement.

The honeycomb structure is prepared so that the gap 34 having a size of 20 μm or more is formed between the plugging portion 32 and the partition wall 2, the length of the gap 34 in the axial direction is 50% or more and less than 95% of the length of the plugging portion 32 in the axial direction, the length of the gap in a face vertical to the axial direction is 20% or more and 50% or less of the length of the inner peripheral surface of the cell, and the gaps are formed in at least ⅓ or more of the plugging portions 32. In consequence, a satisfactory bonding strength, and a satisfactory collection performance are achieved, and a resistance to thermal shock (the electric furnace spalling test result) is improved.

A honeycomb structure according to the present invention can preferably be used as a plugged honeycomb structure for use as a carrier for a catalyst device or a filter such as a DPF.

What is claimed is:

1. A honeycomb structure comprising: a plurality of cells partitioned from one another by porous partition walls and extending through the honeycomb structure in an axial direction to constitute flow paths of a fluid,
   wherein one end of each of predetermined ones of the cells is plugged with a plugging portion made of a plugging material filled into the cell, and the other end of each remaining cell opposite to the one end of the predetermined cell is similarly plugged with a plugging portion,
   in a part of the cells, a gap is formed between the plugging portion and the partition wall separating the plugging portion of a cell and the partition wall by a distance of 20 μm or more, a length of the gap in the axial direction is 50% or more and less than 95% of a length of the plugging portion in the axial direction, a length of the gap in a face perpendicular to the axial direction is 20% or more and 50% or less of a length of an inner peripheral surface of the cell, the face perpendicular to the axial direction is inside the cell away from the ends of the cell, and the gaps in the cells are formed in at least ⅓ of the plugging portions.

2. The honeycomb structure according to claim 1, wherein the cells have a shape selected from the group consisting of a quadrangular shape, a hexagonal shape, a combination of the quadrangular shape and the hexagonal shape and a combination of the quadrangular shape and an octagonal shape.

3. The honeycomb structure according to claim 2, wherein the gaps are formed in one side or two sides of each cell.

4. The honeycomb structure according to claim 1, wherein the plugging portions have lengths of 5 mm or less in the axial direction.

* * * * *